(12) United States Patent
Singh et al.

(10) Patent No.: US 7,873,595 B2
(45) Date of Patent: Jan. 18, 2011

(54) COMPUTING A GROUP OF RELATED COMPANIES FOR FINANCIAL INFORMATION SYSTEMS

(75) Inventors: Amardeep Singh, Bangalore (IN); Arungundram C. Narendran, Bangalore (IN); Bharath Kumar Mohan, Bangalore (IN); Navneet Loiwal, Bangalore (IN)

(73) Assignee: Google Inc., Mountain View, CA (US)

( * ) Notice: Subject to any disclaimer, the term of this patent is extended or adjusted under 35 U.S.C. 154(b) by 933 days.

(21) Appl. No.: 11/361,854

(22) Filed: Feb. 24, 2006

(65) Prior Publication Data

US 2007/0203720 A1   Aug. 30, 2007

(51) Int. Cl.
*G06F 7/00*    (2006.01)
*G06F 17/00*   (2006.01)

(52) U.S. Cl. .................................................. 707/603
(58) Field of Classification Search ............... 707/104.1
See application file for complete search history.

(56) References Cited

U.S. PATENT DOCUMENTS

| 6,356,285 | B1 | 3/2002 | Burkwald et al. |
| 2007/0038543 | A1 | 2/2007 | Weinstein |

OTHER PUBLICATIONS

Bernstein et al., "Discovering Knowledge from Relational Data Extracted from Business News", Proceedings of the 36th Annual Hawaii International Conference on System Sciences, 2003, IEEE.*

Sheth et al., "Semantic Content Management for Enterprises and the Web", IEEE Internet Computing, Jul.-Aug. 2002.*

Conrad et al., "A system for discovering relationships by feature extraction from text databases", Proceedings of the 17th annual international ACM SIGIR conference on Research and development in information retrieval, pp. 260-270, 1994, ACM.*

"Actavis," [online] [Retrieved on May 15, 2006] Retrieved from the Internet<URL:http://www.actavis.com/Investors/stockinfo.htm>, 1 page.

Ahlberg, C. et al., "IVEE: An Information Visualization & Exploration Environment," [online] [Retrieved on May 15, 2006] Retrieved from the Internet<URL:http://www.cs.duke.edu/courses/spring03/cps296.8/papers/ahlberg95ivee.pdf>, 10 pages.

Brin, S. et al., "Beyond Market Baskets: Generalizing Association Rules to Correlations," 12 pages.

Glaser, D.C. et al., "Space Series: Simultaneous Display of Spatial and Temporal Data," [online] [Retrieved on May 15, 2006] Retrieved from the Internet<URL:http://www.sims.berkeley.edu/~hearst/papers/iv99.pdf>, 4 pages.

(Continued)

*Primary Examiner*—Neveen Abel Jalil
*Assistant Examiner*—Michael J Hicks
(74) *Attorney, Agent, or Firm*—Fenwick & West LLP

(57) ABSTRACT

Techniques are disclosed by which users looking for financial information about publicly traded or private companies may richly and interactively navigate both pricing and material news information about those companies. The techniques facilitate and encourage the user's use and understanding of financial information presented. Related company information can also be provided to the user, where related companies are organized by hierarchal categories for a meaningful display.

36 Claims, 8 Drawing Sheets

OTHER PUBLICATIONS

"PerfChart—Interactive Performance Comparison Chart—StockCharts.Com," StockCharts.com, 1999-2006, [online] [Retrieved on May 15, 2006] Retrieved from the Internet<URL:http://stockcharts.com/webcgi/perf.html?GOOG>, 2 pages.

"Quicken 6-in-1—Ch 8—Using Investor Insight," [online] [Retrieved on May 15, 2006] Retrieved from the Internet<URL:http://cma.zdnet.com/book/quicken/ch47/ch47.htm>, 9 pages.

"YHOO: Summary for YAHOO INC—Yahoo! Finance," Yahoo! Inc., 2006, [online] [Retrieved on May 15, 2006] Retrieved from the Internet<URL:http://finance.yahoo.com/q?s=Yhoo, 2 pages.

"Zoom bars—Google Scholar," Google, 2006, [online] [Retrieved on May 15, 2006] Retrieved from the Internet<URL:http://scholar.google.com/scholar?hl=en&lr=&safe=off&c2coff=1&q=%22zoom+bars%22+&btnG=Search>, 2 pages.

"E* Trade Integrates Free News, Charts and Analysis into its Online Trading System," PR Newswire, Aug. 26, 1996, 2 pages, [online] [retrieved on Apr. 23, 2009] Retrieved from the Internet <URL:http://www.highbeam.com/DocPrint.aspx?DocID=1G1:18615032>.

Yahoo!Finance, Charts for Yahoo Inc., Aug. 31, 2003, [online] [Retrieved on Aug. 20, 2009] Retrieved from the internet <URL:http://web.archive.org/web/20030831181207/finance.yahoo.com/q?s=yhoo&d=c>.

* cited by examiner

Related Companies 415

| Related Companies: | | | | |
|---|---|---|---|---|
| Sector: Technology, Industry: Computer Services | | | | |
| Category: Media > Electronic Media > Web Navigation > Search Engines | | | | |
| Category: Technology > Software > Enterprise Management > Content Management | | | | |
| Name/Website Link | Ticker Symbol | Price | Today's Change | |
| Company A | CMPA | 33.74 | -0.59 | (-1.72%) |
| Company B | CMPB | 26.41 | -0.61 | (-2.26%) |
| Company C | CMPC | 13.13 | +0.31 | (2.42%) |
| . | . | . | . | . |
| . | . | . | . | . |
| . | . | . | . | . |
| Company G | CMPG | 4.22 | -0.27 | (-6.01%) |

Fig. 5b

Company Financials 411

| Company Financials (in USD) – Annual | Quarterly | | |
|---|---|---|
| Income Statement | Total Revenue | 3,189,219 |
| Dec. 31, 2004 | Gross Profit | 1,731,569 |
| | Operating Income | 640,190 |
| | Net Income | 399,120 |
| Balance Sheet | Total Current Assets | 2,693,469 |
| Dec. 31, 2004 | Total Assets | 3,313,349 |
| | Total Current Liabilities | 340,370 |
| | Total Liabilities | 384,300 |
| | Total Equity | 2,929,059 |
| Cash Flow | Net Income/Starting Line | 399,120 |
| Dec. 31, 2004 | Cash from Operating | 977,039 |
| | Cash from Investing | -1,901,359 |
| | Cash from Financing | 1,194,619 |
| | Net Change in Cash | 277,879 |

Fig. 5c

COMPUTING A GROUP OF RELATED COMPANIES FOR FINANCIAL INFORMATION SYSTEMS

RELATED APPLICATIONS

This application is related to U.S. application Ser. No. 11/361,838, filed Feb. 24, 2006, and titled "Interactive Financial Charting and Related News Correlation", which is herein incorporated in its entirety by reference.

FIELD OF THE INVENTION

The invention relates to finance, and more particularly, to techniques for compiling and displaying finance and other useful information related to a company.

BACKGROUND OF THE INVENTION

There are a number of online services that provide financial information for companies. The financial information provided typically includes stock charts and related data (e.g., stock price, trading volume, daily price range, 52-week price range, P/E, EPS, market cap, ask/bid, etc). The financial information also usually includes company news as reported by various sources (e.g., such as articles on quarterly earnings reports and other financially relevant events, new product launches, law suits, mergers, acquisitions, partnerships, joint ventures, licensing agreements, and other business dealings).

These services are generally associated with a number of problems. For instance, users have historically been presented with only static visual charts that depict historical financial performance data of publicly traded companies. To change the time frame of a chart, the user typically has to either manually enter the start and stop chart dates (e.g., using a pop-up calendar or typing in dates), or select one of a group of pre-set time periods (e.g., 1-day, 5-day, 1-month, 3-month, 1-year, 5-year, and 10-year). Moreover, the user can only view financial chart data for the specific time period selected.

In addition, reported news is typically displayed separately from the chart, thereby making it difficult for the user to understand how that news may have impacted stock price. This problem is exacerbated when the time period covered by a chart is long, and includes many potentially relevant news articles that may have significantly impacted stock price or otherwise be relevant to a potential investor. Although some companies provide stock charts that are annotated with company-generated news articles, such self-reporting tends to be biased by the company and cannot be completely trusted, relative to a more objective source. For instance, a company generally will not report unfavorable news about itself.

Also, users are typically limited in how they can interact with conventional stock charts. For instance, a user can usually only set the time period that the chart covers. The user has no control, however, over other aspects of information provided. For instance, the user cannot define preferences for the type or focus of reported news that is provided. Nor can the user define the industry category or sector to which the target company belongs, so as to obtain information about other companies relevant to that category/sector.

Also, typical online financial services generate chart images at a server, and then send those images to the requesting client/user. Each time the user requests a new chart view, a new chart image has to be sent to the user. Such systems are wasteful, as they fail to recognize and exploit the overlap between the new and old chart views. In addition, the need to produce chart images from vectors in real-time tends to result in charts that are generally hard to read and lack a professional look and feel, thereby detracting from the user experience. Other services utilize custom software that their users can download and install. While this latter approach can result in an improvement in the user experience, the need to install software on a user's computer may prevent its widespread adoption.

What is needed, therefore, are financial charting techniques that provide improved navigation aids to assist the user, and in a more general sense, techniques that facilitate and encourage the user's use and understanding of financial information presented.

SUMMARY OF THE INVENTION

One embodiment of the present invention provides a method for computing a group of related companies. The method includes locating a co-occurrence of company names, including a target company and one or more other companies, using a first set of sources. The method continues with identifying relationships between the target company and each of the other companies, and verifying each identified relationship using sources not included in the first set of sources. The method continues with identifying hierarchical business categories to which the target company belongs, and identifying one or more of the verified related companies associated with one or more of the identified business categories of the target company. The method may include providing the identified one or more verified related companies in response to a user request for financial information about the target company. In one particular embodiment, locating a co-occurrence of company names further includes one or more of the following: identifying all proper nouns in a given context, identifying company names included in the identified proper nouns, identifying known name variations of the target company, identifying known aliases of the target company, and/or disambiguating ambiguous terms based on co-occurrence context. In another particular embodiment, identifying relationships between the target company and each of the other companies further includes determining an overall score for a co-occurrence of the target company and another company (based on one or more relationship indicators), and indicating a relationship between the target company and that other company if the overall score satisfies a relationship indicator threshold. In one such case, determining the overall score includes one or more of the following: determining if a co-occurrence context has many companies indicated at once; determining where a co-occurrence is located in a document; determining if a co-occurrence is located in a special context, including headlines or headings; determining if a co-occurrence is reported by a reputable source; determining a pagerank associated with a co-occurrence is located in a document; and determining if a co-occurrence is associated with business relationship indicator words. In another such case, verifying each identified relationship further includes adjusting the overall score for an identified relationship (based on one or more supplemental relationship indicators), and verifying the identified relationship if the adjusted overall score satisfies a verified relationship indicator threshold. In another particular embodiment, verifying each identified relationship further includes determining an overall score for an identified relationship (based on one or more relationship indicators), and verifying the identified relationship if the overall score satisfies a relationship indicator threshold. In one such case, determining the overall score includes one or more of the following: determining if supplemental information sources indicate business, geography, or stock exchange in which co-occurring companies operate; determining if supplemental information sources indicate at least one of competing products and services of occurring companies; determining if supplemental information sources tend to treat co-occurring companies disparately; determining if supplemental information sources that list businesses organized along hierarchical categories indicate co-occurring companies in one or more similar categories; determining if supplemental information sources, including SEC filings, indicate co-occurring companies are direct competitors; determining if supplemental information sources indicate an overlap of at least one of industries, sectors, and geographies in which co-occurring companies operate; determining if supplemental information sources indicate a correlation between movements of stock prices of co-occurring companies; determining if supplemental information sources indicate frequency of a co-occurrence exceeds a co-occurrence frequency threshold; determining if supplemental information sources indicate overlap of co-occurring companies' products; determining if supplemental information sources, including aggregated user navigation histories, indicate co-occurrences of companies; and determining if supplemental information sources, including aggregated user portfolio data, indicate co-occurrences of companies. In another particular embodiment, identifying one or more of the verified related companies includes comparing one or more of the verified related companies to a list of companies associated with one or more of the identified hierarchical business categories to which the target company belongs, to identify matches. In one such case, related companies provided in response to a user request include at least one of a high scoring verified related company and a verified related company that matched a company on the list.

Another embodiment of the present invention provides a machine-readable medium (e.g., one or more compact disks, diskettes, servers, memory sticks, or hard drives) encoded with instructions, that when executed by one or more processors, cause the processor to carry out a process for computing a group of related companies. This process can be, for example, similar to or a variation of the previously described method.

Another embodiment of the present invention is a system for computing a group of related companies. The system includes a co-occurrence mining module for locating a co-occurrence of company names, including a target company and one or more other companies, using a first set of sources. The system further includes a relationship identifier module for identifying relationships between the target company and each of the other companies, and a relationship verifier module for verifying each identified relationship using sources not included in the first set of sources. The system further includes a hierarchal category identifier module for identifying hierarchical business categories to which the target company belongs, with the categories in order of category priority. The system further includes a hierarchal category placer module for identifying one or more of the verified related companies associated with one or more of the identified business categories of the target company. In one such embodiment, the relationship identifier module is further configured for determining an overall score for a co-occurrence of the target company and another company (based on one or more relationship indicators), and for indicating a relationship between the target company and that other company if the overall score satisfies a relationship indicator threshold. In one such case, the relationship verifier module is further configured for adjusting the overall score for an identified relationship (based on one or more supplemental relationship indicators), and for verifying the identified relationship if the adjusted overall score satisfies a verified relationship indicator threshold. In another particular embodiment, the relationship verifier module is further configured for determining an overall score for an identified relationship (based on one or more relationship indicators), and for verifying the identified relationship if the overall score satisfies a relationship indicator threshold. In another particular embodiment, the hierarchal category placer module is further configured for comparing one or more of the verified related companies to a list of companies associated with one or more of the identified hierarchical business categories to which the target company belongs, to identify matches. The system functionality can be implemented, for example, in software (e.g., executable instructions encoded on one or more computer-readable mediums), hardware (e.g., gate level logic or one or more ASICs), firmware (e.g., one or more microcontrollers with I/O capability and embedded routines for carrying out the functionality described herein), or some combination thereof. Many suitable means for implementing embodiments of the present invention will be apparent in light of this disclosure.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

FIGS. 5a, 5b, and 5c each illustrate details of the user interface shown in FIG. 4, configured in accordance with another embodiment of the present invention.

DETAILED DESCRIPTION OF THE INVENTION

Figure 1:
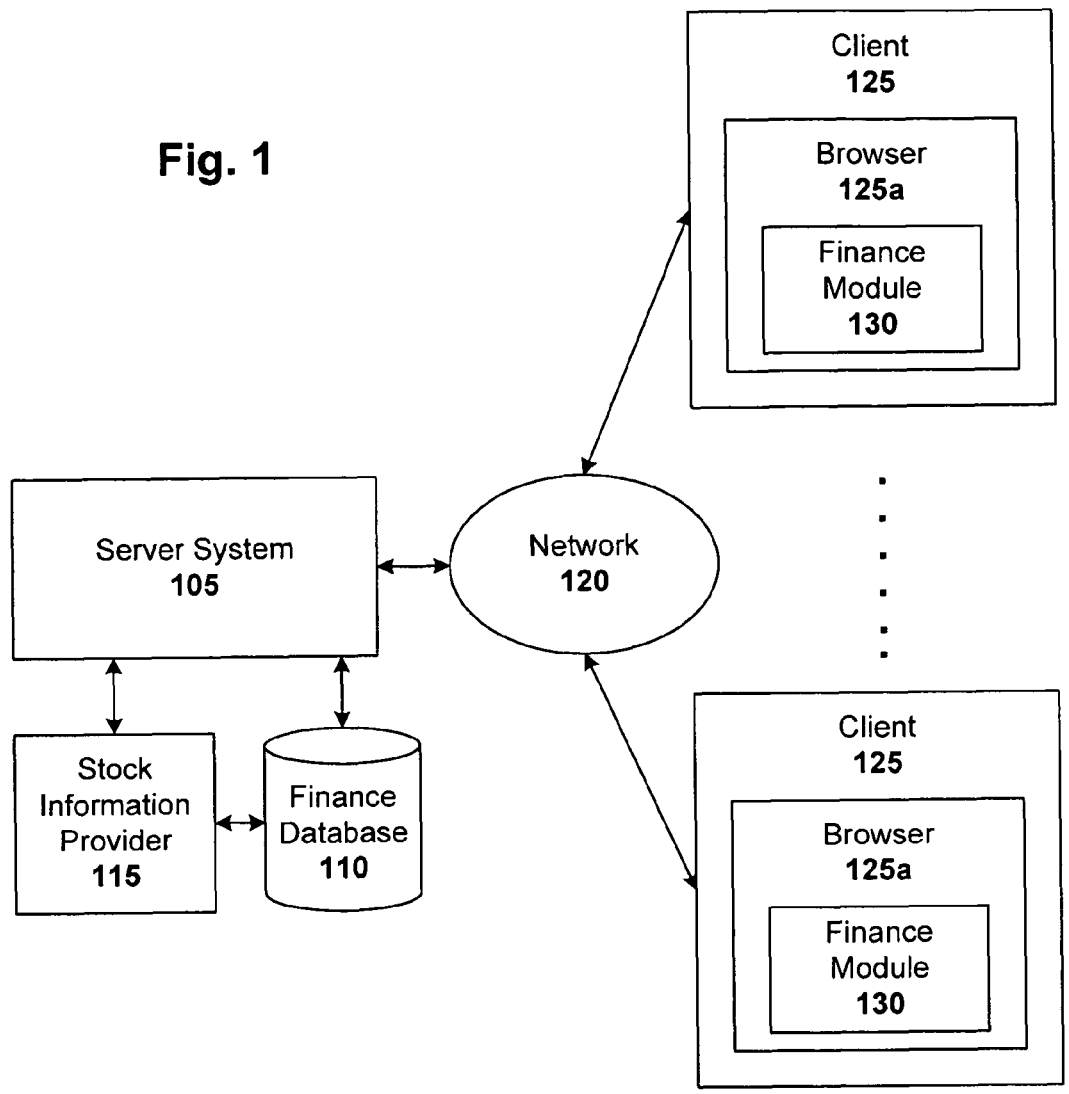
FIG. 1 is a block diagram of a system configured for providing financial/company data in accordance with one embodiment of the present invention.

Techniques are disclosed by which users looking for financial information about publicly traded or private companies may richly and interactively navigate both pricing and material news information about those companies. The techniques facilitate and encourage the user's use and understanding of financial information presented. Related company information can also be provided to the user, where related companies are selected based on their computed relatedness to the target company.

General Overview

One embodiment of the present invention provides a user interface that allows users to navigate news and stock prices (and/or other stock parameters, such as volume, insider trading in the aggregate or per individual, institutional buying/selling, P/E ratio, EPS, etc) simultaneously in a visual manner. In particular, a flag is displayed for each relevant news item directly on the graph, anchored in the time scale of the chart at the time the related news article was published. As the user pans, drags, zooms, or otherwise adjusts the time scale of the chart, relevant news included in that time frame is displayed in the form of flags.

Each news flag displayed on the chart corresponds to a link in a news section (e.g., located at the side of the chart). The user can click or otherwise select the news link or the flag to read that particular news article (or group of articles). Each news link can be associated with a snippet to give the user an idea of the article content. In addition, candidate news events can be ranked, where only higher ranked candidate links are displayed to the user. In one such embodiment, only those article links having a rank that exceeds a certain relevance threshold are displayed to the user. If there are too many articles that satisfy the relevance threshold to display, then only the top N (e.g., 10 to 15) ranked article links for the displayed time period are shown. Such time-correlated flags (or other suitable symbols) can be expanded to indicate any relevant event (not just news articles), where the event symbol is anchored at a corresponding point in time (or range of time) of the displayed chart. As the time scale or "zoom level" decreases, the number of articles selected for display per day can increase accordingly. Also, the number of flags displayed on the graph can be different than the number of news articles shown in the news section. The user can pan across the chart time period by selecting flags/links in the news section that correspond to time periods not currently covered by the chart. Once the user selects such a flag/link in the news section, the chart will automatically pan to that time period and show a flag anchored in time corresponding to that selected flag/link. Likewise, the user can scroll items displayed in the news section by selecting flags on the chart. For instance, if the user selects a flag on the chart that corresponds to an article published in May of 2004, and the news section currently shows links to articles up to January 2004, then the news section will scroll until article links including the May 2004 article link are shown in the news section. Users may also add custom flags to indicate activity or events of their choosing.

A second or "overview" chart can also be provided, in addition to the main chart. The overview chart (e.g., located at the top of the main chart) has a larger time scale, in order to provide the user with a point of reference while panning and examining fine-granularity data in the main chart view. The main chart view is typically on a shorter time scale than the overview chart. Navigation aids are provided on the main chart and/or the overview chart, and the display of both charts will update as the user zooms, pans, drags, or otherwise adjusts the time period being viewed. In one particular embodiment, a user-adjustable viewing window is displayed on the overview chart, wherein the time period covered by the main chart is defined by placement of the viewing window on the overview chart. In one such case, only links to articles that published within the time period specified by the viewing window (and main chart) are displayed to the user.

Both the main chart and overview chart (if applicable) can be updated incrementally, so that only data needed for a new time period (based on user adjustment of time axis) is requested. Thus, data already being displayed to the user does not need to be re-transmitted to the user, or redrawn. In one particular embodiment, a tile-based charting system is used, where charts and graphics are assembled using a series of tiles that are served to the user on an as needed basis, as the user adjusts the time axis of the chart. Client-side and/or server-side predictive caching (e.g., raw chart data that is used to draw images or tile images, news data, related company data, etc) can be employed to reduce server network and/or back-end traffic, if so desired. The financial data of the main chart graph can be a subset of the financial data of the overview chart graph (e.g., main and overview charts are both stock price charts for the same company). Alternatively, the financial data of the main chart graph can be distinct from the financial data of the overview chart graph (e.g., main chart is stock price and overview chart is stock parameter other than price, or vice-versa; main and overview charts are both stock price charts, but for different companies; main chart is stock price and overview chart is an index chart, such as S&P 500 or other such index graph. In one such particular case, the user can select a first type of financial data for the main chart graph and a second type of financial data for the overview chart graph.

Related company information can also be provided to the user. One such embodiment provides a technique for computing set of companies related to the user's target company, and displaying those related companies. In one such case, multiple information sources are analyzed to identify co-occurrences of names of companies and/or co-occurrence of competing products. Whether a relationship between those companies exists can then be determined, by estimating the significance of the co-occurrence (based on one or more metrics, such as location of co-occurrence in article and/or credibility of source and/or pagerank). Identified relationships between companies can then be verified based on supplemental information sources. The verified related companies can then be clustered or otherwise organized into hierarchal categories for display.

System Architecture

FIG. 1 is a block diagram of a system configured for provided financial data and other company information, in accordance with one embodiment of the present invention. In this example, the financial data provided by the system includes stock data for publicly traded companies. Other data may also be provided by the system, such as financials (e.g., balance sheet), news, related companies, and general company info. Note that such information can also be provided for privately held companies, when available. As will be appreciated in light of this disclosure, the system can be used to provide data relevant to other investment vehicles as well, such as mutual funds and/or commodities. Thus, the system can effectively be employed to provide a comprehensive financial information service.

As can be seen, the system includes a client-server architecture, where the server-side communicates with one or more clients 125 via a network 120. The server-side includes a server system 105 that is communicatively coupled with a finance database 110. Also, a stock information provider 115 is included, which is a third party source that can be used to provide a feed of typical stock data (e.g., stock price, trading volume, daily price range, 52-week price range, P/E, EPS, market cap, ask/bid, trade particulars, etc) to the system. On the client-side, each client 125 includes a browser 125a in which a finance module 130 is executing. The system allows users to interactively navigate a company's stock price charts, material news information about that company, and/or related company information (whether about the target company or competitors).

The server system 105 is configured to harvest or otherwise receive financial information relevant to companies, as well as other company information that might be useful in evaluating the company (e.g., for investment or general interest purposes). The information is processed as needed, and then stored in the finance database 110. In this particular embodiment, the stock information provider 115 provides the server system 105 with stock information (e.g., ticker symbol and associated stock parameters, such as price, volume, market cap, outstanding shares, etc) from which stock price charts can be generated. The server system 105 may also have access to other information services and/or sources, so as to acquire other relevant company information such as income statements, balance sheets, cash flows, company summary and facts, management team, and/or related companies. In one particular embodiment, the server system 105 has access to the World Wide Web (WWW) and is configured to mine for company data. Numerous types of company information can be provided to, harvested by, or otherwise accessible to the server system 105 (e.g., blog posts from the company and/or independent bloggers).

In addition to data harvesting, formatting, and/or storing, the server system 105 enables communication with the client-side finance modules 130, via the network 120. In particular, the server system 105 receives requests for financial data from clients 125, and responds to those requests with the appropriate financial data. The request received by the server system 105 may include, for example, a stock ticker symbol, company name, or other target entity identification data. The target entity identification data is parsed and broken down into constituent components if necessary (e.g., "Google" "Inc"). Proper name data can then be used to identify the corresponding ticker symbol (if applicable), and can be used to identify related finance and/or company information that will be provided to the requesting user. In addition, in the event that only a partial target entity information is sent, the server system 105 can further be configured to identify missing name components (e.g., by accessing a business listings database or service). In any case, the server system 105 receives the request, and retrieves the appropriate financial information from the finance database 110, and prepares a response to that request.

The financial data in the response can be, for example, stock price chart data and stock parameter data. Other financial data may be included as well, such as income statement, balance sheet, and/or cash flow data. The response may also include a company summary and facts, management team information, and names of related companies. Other information may also be provided by the server system 105, such as blog posts from the company and/or independent bloggers. In one particular embodiment, the response includes the data from which stock charts and reports can be generated or otherwise created at the client 125 (e.g., using JavaScript). Alternatively, the charts/report can be built or otherwise formatted at the server system 105, and then sent to the client 125 for display (e.g., like a web page with embedded controls). Numerous server system configurations can be used as will be apparent in light of this disclosure, and the present invention is not intended to be limited to any one configuration.

Conventional or custom technology can be used to implement the communication between the server system 105 and the client 125. In one particular embodiment, Ajax calls are used to transfer financial data between client 125 (browser 125a where finance module 130 is running) and the server system 105 (which is in communication with the finance database 110). As is known, Ajax can be used to send requests to a web server (e.g., included in server system 105) to retrieve only the data that is needed at the client (e.g., by the finance module 130), typically using SOAP (Simple Object Access Protocol) or other suitable XML-centric web services protocol. At the browser 125a on client 125, JavaScript or other suitable language can be used to process web server responses (e.g., to generate or otherwise format for display stock price charts and other financial data). The result is a simplified and more responsive user interface, since the amount of data exchanged between the web browser 125a and web server of server system 105 is reduced. Server-side processing time is also reduced, since client-side processing is employed. Thus, an incremental "real-time" update approach can be used, where data (e.g., used to build price charts) is provided using Ajax or similar technology to the browser finance module 130 on an as needed basis, based on user adjustments of the chart time access. Client-side JavaScript or other such technology is used to build the updated price chart based on the data sent. Likewise, the client can incrementally update the server using similar mechanisms, if so desired. Other communication techniques, such as HTTP/CGI (e.g., get and post commands) or WAP, can also be used to transfer data.

The finance database 110 can be implemented with conventional or custom database techniques or other storage mechanisms. As can be seen, the database 110 can receive data from the server system 105 and the stock information provider 115 (or other such sources), if so desired. In one particular embodiment, the database 110 is a relational database configured with a schema that facilitates retrieval of finance data for a given company and/or ticker symbol. Numerous data storage facilities and organizational schemes can be used to implement database 110, whether relational or object-oriented or a look-up table or other suitable storages.

The server-side architecture and functionality will vary from one embodiment to the next, as will be apparent in light of this disclosure. For instance, the database 110 can be integrated into the server system 105. Also, a distributed database scheme can also be used. Other server-side functionality and structure, such as scalability, load balancing, redundancy, and failover capability, may also be included using conventional or custom technology. Further details of server system 105 are provided with reference to FIGS. 2a, 2b, and 6.

The network 120 may be any type of communications network, such as a local area network (e.g., intranet), wide area network (e.g., Internet), or some combination thereof. Alternatively, the network 120 may be a direct connection between a client 125 and the server system 105. In general, communication between the server system 105 and a client 125 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

A client 125 on which the finance module 130 runs can be, for example, a desktop or laptop computer. Alternatively, a client 125 can be a wireless device, such as a personal digital assistant (PDA) or other such computing device (e.g., smart phone). In short, the client 125 in this particular example can be any computer or device that can execute the finance module 130, and allows the user to interact with the server system 105 (e.g., requesting financial data searches and changing time frame of the stock price and/or other such charts). In one particular embodiment, the finance module 130 runs as an applet within the browser 125a. In this case, the browser 125 is applet-enabled and can be, for example, Microsoft's Internet Explorer browser, Netscape's Navigator browser, Mozilla's Firefox browser, OpenWave's mobile computing browser, or any other browsing or application software capable of communicating with a server via a network.

Depending on the system configuration, the functionality of the finance module 130 will vary. For instance, in one embodiment, all image building (e.g., charts and graphs) is carried out on the server-side, and the finance module 130 on the client-side receives finance images from the server-side (e.g., in batch or incrementally) and displays those images to the user. In alternative embodiments, the finance module 130 is configured to receive finance data from the server-side, and to build images from that data. In any case, the finance module 130 allows the user to request financial data from the server system 105. The requested data is then received, processed as necessary, and displayed by the module 130. The module 130, in conjunction with its user interface, further allows the user to interact with that displayed data. For instance, data can be displayed to the user in the form of financial charts configured with user interface controls such as pan and zoom. Other user interface features, such as draggable charts can also be used (e.g., draggable tile-based and non-tile-based finance charts that graph stock price and other graphable parameters).

Just as with the server-side architecture, the client-side architecture and functionality may also vary from one embodiment to the next. For instance, the finance module 130 can exist independently of the browser 125a (e.g., as an executable application stored on client 125 and configured to request finance data from the server-side, and to build financial price charts and other graphics). The finance module 130 is discussed in more detail with reference to FIGS. 3, 4, 5a, 5b, and 5c.

Other system architectures will be apparent in light to this disclosure. For example, consider a system where the user can interact with that system via her telephone (e.g., cell phone, home phone, smartphone) or any other electronic input/output device, whether mobile or not. In such a system, the user's communication device can be thought of as the client-side, and the service being dialed into or otherwise accessed can be thought of as the server-side. The communication link between the communicating devices can be implemented with any number of technologies (e.g., GSM or VoIP), and may carry any type of data (e.g., voice, data). The mode of input/output between the communication devices can be speech and/or data based (e.g., IVR with voice and/or touch-tone interface).

Other system functionalities can also be implemented here. For example, client-side and/or server-side predictive caching can be used. The type of data cached will depend on the configuration. For instance, in embodiments where images are generated on the client-side from raw data (received from server system 105), the caching scheme may include caching data relevant to the user's current zoom level and position. In more detail, if the user consistently zooms from a 5-day view to a 1-year view (e.g., based on logged user navigation history or an assumption that the user will zoom), then data needed to generate that 1-year view can be predictively cached at the client-side (e.g., in the finance module 130 or in a storage otherwise accessible by the module 130) when the user requests the 5-day chart. Thus, as the user navigates to higher zoom levels (i.e., larger time periods), that locally cached data can be accessed to draw or otherwise generate the corresponding chart. In one particular embodiment, for each zoom level requested by the user that requires server access, the served chart data includes the actual requested data and an additional period (e.g., 1 to 6 months) of chart data in both time directions of the chart. In a similar fashion, and for embodiments where tile or other such chart images are served to the client-side and then assembled for display, those tiles/images can be predictively cached on the client-side (where each zoom level includes a set of tile images that can be cached). Similar caching schemes can be used on the server-side, for example, to reduce the need for front-end servers to access back-end servers (if applicable).

Server System

Figure 2A:
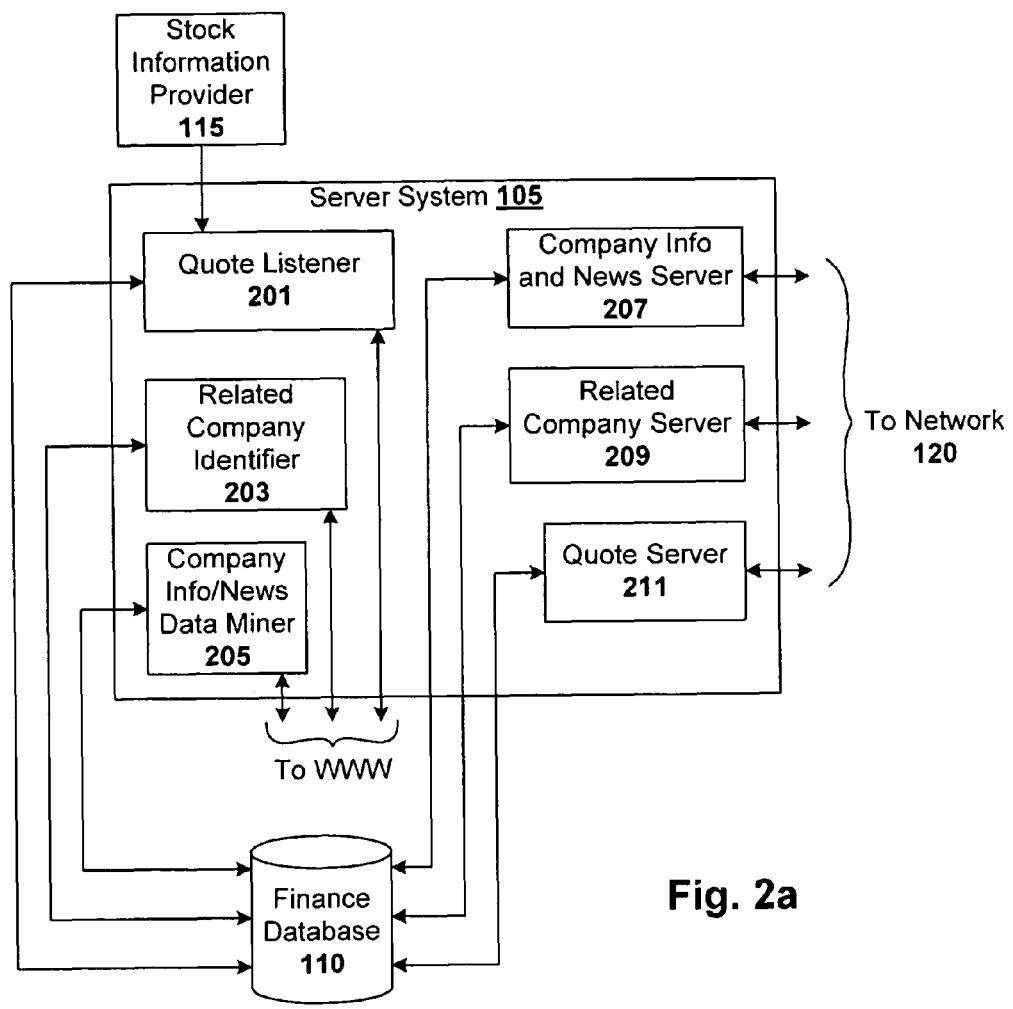
FIG. 2a is a block diagram of a server system shown in FIG. 1, configured in accordance with one embodiment of the present invention.

FIG. 2a is a block diagram of a server system shown in FIG. 1, configured in accordance with one embodiment of the present invention.

As can be seen, data from various sources on the WWW, is harvested by the server system 105, and then stored in finance database 110. Also, the stock information provider is used to provide stock information (e.g., charting data and stock parameters). Various other services can also be used to provide data to server system 105. In any case, the server system 105 receives requests for company information, and responds to those requests, via network 120.

In this example configuration, the server system 105 includes a quote listener module 201, a related company identifier module 203, a company info/news data miner module 205, a company info and news server 207, a related company server 209, and a quote server 211. Each of these modules can be implemented, for example, in software (e.g., C, C++, Java, or other suitable programming language), hardware (e.g., gate level logic or ASIC), firmware (e.g., microcontroller configured with I/O capability for receiving data from external sources and a number of routines for carrying out quote listening/serving, related company identification/serving, and company data mining/serving functions as described herein), or some combination thereof. In addition, note that the modules are shown as separate for purposes of illustration, and that other embodiments may have the various functionalities or sub-sets thereof integrated into a single module.

The quote listener module 201 is programmed or otherwise configured to receive stock market data from the stock information provider 115, and to calculate that data into finance data as needed to respond to user requests (e.g., such as the open price, close price, volume, etc for different periods of time). The quote listener module 201 can also be configured to transform the received data into compliance with the schema of finance database 110 (if necessary). Note that some real-time data received from the provider 115 (e.g., such as current ask, bid, and price) can be processed by the quote listener module 201 and provided directly to the quote server 211 (without storing data in database 110), if so desired.

In one particular embodiment, the format in which the data is received from provider 115 is compliant with the schema such that the quote listener module 201 receives and stores the data. In the example depicted, the quote listener module 201 can also access the WWW for target entity data. In such a case, the quote listener module 201 may be accessing diverse data sources, and will transform that data as necessary prior to storing the data into the finance database 110. The data received by the quote listener module 201 includes, for example, all or a sub-set of: company name, ticker symbol, streaming price quote data, and other relevant stock parameters (e.g., day's price range, 52-week range, volume, average volume, price to earnings ratio (P/E), forward P/E, earnings per share (EPS), beta, return on equity, market cap, sales, current dividend yield, dividend/share, opening price, previous closing price, bid, bid size, ask, ask size, institutional ownership percentage, total shares outstanding, and exchange). Other stock parameters that can be received by module 201 will be apparent in light of this disclosure. Thus, the database 110 is populated with historical can current stock information that can be served in response to user requests. As previously indicated, the system 105 may also provide information on other investment vehicles (e.g., mutual funds, futures, commodities, etc), with the listener module 201 and provider 115 configured accordingly based on the target investment vehicle.

Figure 2B:
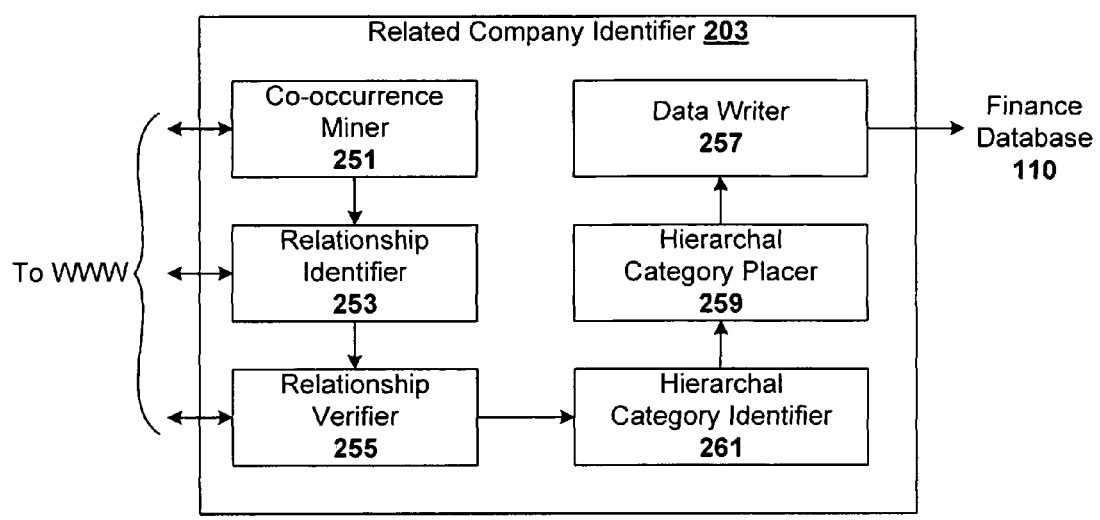
FIG. 2b is a block diagram of a related company identifier shown in FIG. 2a, configured in accordance with one embodiment of the present invention.

The related company identifier module 203 is programmed or otherwise configured to compute a set of companies related to a target company and to group those related companies based on their associations with one or more categorical hierarchies of the target company. Additional detail of module 203 is discussed with reference to FIG. 2*b*. The related company identifier module 203 analyzes multiple sources (e.g., WWW sources such as company website postings, blog postings, etc; online news sources such as CNN, New York Times, San Jose Mercury News, etc; news services such as Reuters, Bloomberg, Associated Press, UK Press Association, Agence France-Press, Australian Associated Press, etc) to identify co-occurrences of names of companies. As shown in FIG. 2*b*, the co-occurrence miner module 252 is configured to access such multiple independent sources via the WWW (or by other suitable means, such as direct feeds from new services). The relationship identifier module 253 of module 203 then evaluates the significance or weight of each co-occurrence, based on a number of metrics or "relationship indicators."

For example, a co-occurrence is weighted lower (e.g., relative to an average weight) if the context had many companies mentioned at once. Also, co-occurrences at the start of an article or page can be weighted higher than co-occurrences toward the end of an article or page. Similarly, co-occurrences in special contexts like headlines or headings can be weighted higher. Also, the reputation of a news source of the context can be used as a factor to evaluate the significance of the co-occurrence (e.g., higher reputation equals greater weight). Likewise, measures like pagerank for a page associated with the context can be used as a factor to evaluate the significance of the co-occurrence. Example such pagerank techniques are described in U.S. Pat. No. 6,285,999 ("Method for Node Ranking in a Linked Database") and U.S. Pat. No. 6,799,176 ("Method for Scoring Documents in a Linked Database"), each of which are herein incorporated by reference. Also, special keywords can be detected in the context that are indicative of relationships between companies. For instance, co-occurrences in contexts that include other words like "rivals," "competitors," "partners," "acquisition," and "merger" can be weighted higher than a "naked" co-occurrence (no weight increasing words in the context). Similarly other words/phrases like "stocks rose" can be neglected since they do not indicate a real relationship between the companies. Based on one or more such relationship indicators, a score (e.g., sum of all weights) is computed by the relationship identifier module 253. Thus, an overall score of each co-occurrence can be determined by the intrinsic content of a document in which the co-occurrence exists, and/or from the anchor text of backlinks to the document, and/or from the extrinsic relationships between the document and other documents that refer to the document. The higher the score, the more likely that there is significant relationship between the identified co-occurring companies.

The relationship verifier module 255 of module 203 then verifies the identified relationships between companies, based on supplemental information available from other sources different than the initial relationship indicator sources. Example supplemental sources include business catalogues, directory services, competitor listings in SEC filings, correlations between the movements of stock prices, and/or competing products and product advertising. In one particular embodiment, the initial score computed by the relationship identifier module 253 is then adjusted up or down by the relationship verifier module 255, depending on the supplemental information for other sources.

The related company identifier module 203 then selects one or more of the highest scoring verified related companies that overlap with hierarchal business categories of the target company. In more detail, the target company and related companies are typically associated with known business categories in which they operate (e.g., numerous publicly available business catalogues, directory services, and registration lists enumerate businesses organized along hierarchical categories). These business categories generally form a hierarchical tree (an ontology for businesses). For instance, Google Inc. might belong to the specific category "Search Engines," which is contained in the general category "Internet Services." These categories are identified by the hierarchal category identifier module 261 of module 203. The hierarchical categories of a company implicate a priority, where the most specific category (e.g., "Search Engines") would be given highest priority, and the most general category (e.g., "Internet Services") would be given lowest priority. Intermediate categories between these two extreme categories (if any) are prioritized accordingly. In any case, high priority categories of the target company can be used to select the verified related companies (that also exist in those high priority categories, or are otherwise relatively close to those categories). The hierarchal category placer module 259 of module 203 is configured to select the high scoring verified related companies, based on such category overlap/proximity with the target company. The related companies, including their hierarchal categories, can be stored in database 110 by the data writer module 257. Alternatively, the related company information can be served to the client-side without being stored.

The related company identifier 203 can also be used to identify and generate a list of competing products (e.g., Google Talk and Yahoo Messenger, or Intel Pentium 4 and AMD Athlon). In one such embodiment, multiple information sources are analyzed to identify co-occurrences of competing products. Whether a relationship between those products exists can then be determined, by estimating the significance of the co-occurrence (based on one or more metrics, such as location of co-occurrence in article and/or credibility of source and/or pagerank). Identified relationships between products can then be verified based on supplemental information sources. The verified related products can then be clustered or otherwise organized into hierarchal categories for display. The previous discussion with reference to FIG. 2*b* relevant to computing a group of related companies is equally applicable to computing a group of related products.

The company info/news data miner module 205 is programmed or otherwise configured to mine the WWW and/other otherwise utilize available information sources to collect company information and news articles on that discuss the company. Collected company information includes, for example, a summary or snapshot of company's function in the industry, company facts (e.g., address of headquarters, telephone and fax numbers, website URL and site links, fiscal year end, past year sales amount, 1-year sales growth, yearly income, 1-year net income growth, number of employees, management team, and other collectable company info). The news articles are mined or otherwise collected from multiple sources (e.g., including news services such as Reuters, Associated Press, etc). The collected company information and news articles (along with their respective publication dates) are stored into database 110. The collected data can be transformed to comply with the desired schema, as necessary, using conventional or custom transformation techniques.

The company info/news data miner module 205 can further be configured to rank candidate news article links, so that only higher ranked links (e.g., for a given time period of interest) are provided to the user. For example, links to articles that report a significant jump in stock price can be ranked higher (e.g., relative to an average rank). Likewise, links to articles reporting significant exchanges of money, stock, or other value (such as an acquisition, merger, or licensing agreement valued at more than one million dollars) between a company of interest and another company can be ranked higher. Also, news events that are widely reported by multiple sources can be ranked higher (e.g., such as when multiple news sources independently report a news event, or when one source is first to report a news event and other sources cite that initial report). In this sense, a pagerank function can be used to rank the articles, such as described in the previously incorporated U.S. Pat. Nos. 6,285,999 and 6,799,176. Also, special keywords and phrases can be detected in the articles that are indicative of link importance/relevance. For instance, articles that include words/phrases like "legal battle," "law suit," "acquisition," "merger," "stocks rose" and "reported quarterly earnings," "stock soars," and "stock plummeted" can be ranked higher. Thus, article rank can be determined based on intrinsic content of the candidate article, and/or from the anchor text of backlinks to the candidate article, and/or from the extrinsic relationships between the candidate article and other documents/sources that refer to the candidate article. In one such embodiment, only those articles having a rank that exceeds a certain relevance threshold are displayed to the user. If there are too many articles that satisfy the relevance threshold to display, then only the top N (e.g., 10 to 15) ranked article links for the displayed time period are shown. Scrolling and panning interactions between the chart flags and news links provide additional user interface mechanisms to manage large amounts of news items, as described herein.

Thus, by operation of the quote listener module 201, the related company identifier module 203, and the company info/new miner module 205, the financial database 110 is fully populated with the data from which user requests can be answered. For instance, a user at a client 125 can access the server system 105 via network 120, for example, by entering the appropriate URL (e.g., www.GoogleFinance.com) into the browser 125a. After a main page loads in the user's browser 125a and the user enters a company name or ticker symbol (or other such identifiers) into the search box, the finance module 130 makes a request through the network 120 to the quote server 211 for the corresponding company/finance data. The quote server 211 then accesses the database 110 to retrieve that data, and sends the data in response to the user's request. The finance module 130 then receives that data and display the requested information (e.g., pricing and volume information for a given period of time).

In one particular embodiment, the quote server 211 responds with the requested data in a text only format, and the finance module 130 parses that text data and draws the chart (and/or other graphics) accordingly, using client-side programming techniques such as JavaScript or other suitable programming languages. In another particular embodiment, the server system 105 is implemented as described in U.S. application Ser. No. 11/088,542, filed Mar. 23, 2005, titled "Generating and Serving Tiles in a Digital Mapping System," and Ser. No. 11/051,534, filed Feb. 5, 2005, titled "A Digital Mapping System." Each of these applications are herein incorporated in their entirety by reference. In such an alternative configuration, the server system 105 includes one or more tile servers for serving tiles that make up the requested financial chart, and one or more web servers for serving other data associated with the user's request (e.g., company summary and facts, financials, related companies, and management) that is overlaid on the tiles, or proximate the tiles, in the user's display area.

Note that in both these embodiments, the financial charts can be incrementally updated as the user pans, drags, or otherwise interacts with the displayed chart (as opposed to redrawing the entire chart and without the browser 125 needing to reload the whole page). For instance, and with reference to the first embodiment, if the user drags the chart in one direction on the timeline (or otherwise adjusts the view of the chart), then the finance module 130 will request the data needed to complete the new area of the chart. The quote server 211 will respond to that request by sending the appropriate data in text format. The finance module 130 will receive that data, and draw the new portion of the chart. In the alternative embodiment, if the user drags the chart in one direction on the timeline (or otherwise adjusts the view of the chart), then the finance module 130 will request the tiles needed to complete the new area of the chart. The server system 105 (e.g., a tile server therein) will respond to that request by sending the appropriate tiles, as described in the previously incorporated application Ser. Nos. 11/088,542 and 11/051,534. The finance module 130 will receive each tile, and place each tile in its respective position in the chart.

The related company server 209 and the company info and news server 207 each operate in a similar fashion to the quote server 211, in that they both receive user requests for data, access the database 110 to retrieve that data, and send the data back to the requesting user. As will be appreciated, although a single request from the user is received, each of the servers 207, 209, and 211 can receive and respond to that request with its corresponding data. Moreover, note that the servers 207, 209, and 211 are shown as separate for purposes of explanation, but can also be implemented as an integrated server function.

Client-Side Finance Module

Figure 3:
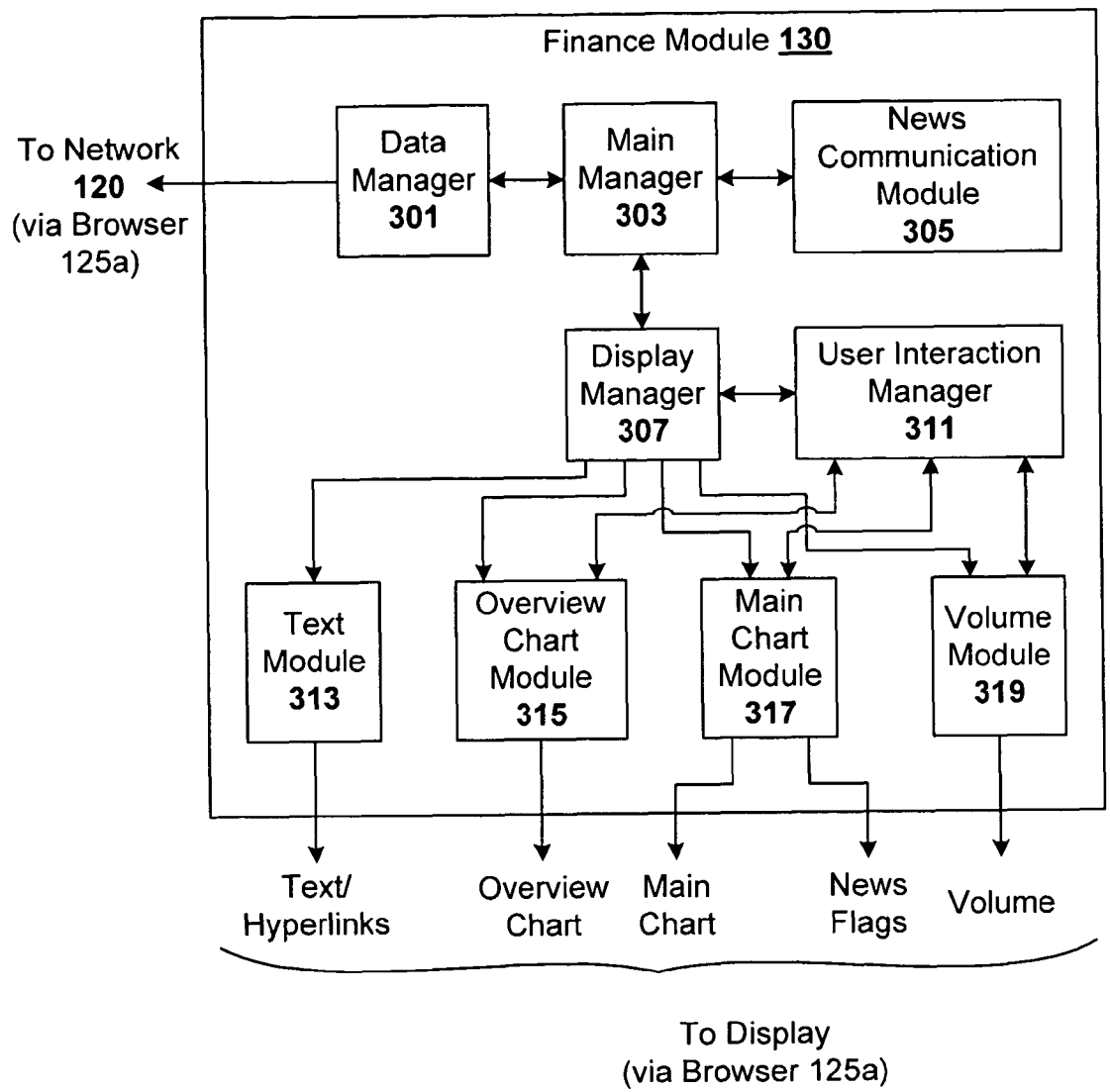
FIG. 3 is a block diagram of a client-side finance module shown in FIG. 1, configured in accordance with one embodiment of the present invention.

FIG. 3 is a block diagram of a client-side finance module 130 shown in FIG. 1, configured in accordance with one embodiment of the present invention. As previously explained, the finance module 130 can be programmed to execute in the user's browser 125a, as in this example configuration (or some other executable). The finance module 130 operates in conjunction with a user interface, which will be discussed with reference to FIGS. 4, 5a, 5b, and 5c.

In response to user requests for data (e.g., interaction via the user interface), the finance module 130 sends those requests to the server system 105 via the network 120. Responses are received from the server system 105 and processed by the finance module 130, and provided to the user's display. This request/response process is repeated as necessary, based on user input. The information displayed by the module 130 includes, for example, a main chart (e.g., stock price chart) with time-correlated news flags on the chart graph, a snippet/link to news articles corresponding the each news flag (e.g., news snippets/links to the side of the chart), an overview chart with a user-adjustable viewing lens that corresponds to the main chart view, trading volume, and informational text and other links (e.g., company summary and links to objective company summary sources, company facts and links to company website, financials with links to balance sheet and other such financial statements, management team with links to bios, related companies in a categorized hierarchy with links to each company and to each hierarchal category to which the companies belong, and blog posts/snippets with links to corresponding blog pages).

In this example configuration, the finance module 130 includes a data manager 301, a main manager 303, a news communication module 305, a display manager 307, a user interaction manager 311, a text module 313, an overview chart module 315, a main chart module 317, and a volume module 319. Each of these modules can be implemented, for example, in software (e.g., C, C++, Java, JavaScript, or other suitable programming languages), hardware (e.g., gate level logic or ASIC), firmware (e.g., microcontroller configured with I/O capability for carrying out requesting/receiving of data, data processing, and data display functions as described herein), or some combination thereof. In addition, note that the modules are shown as separate for purposes of illustration, and that other embodiments may have the various functionalities or sub-sets thereof integrated into a single module.

The main manager 303 is programmed or otherwise configured as the entry point or main function of the finance module 130 application, and manages the overall operating and processing performed by module 130. The main manager 303 is in communication with the data manager 301, the news communication module 305, and the display manager 307.

The data manager 301 is programmed or otherwise configured to carryout communication with the servers of the server system 105 (e.g., quote server 211, related company server 209, and company info and news server 207). In particular, the data manager 301 sends requests for data and receives responses to those requests. The data manager 301 is further configured to parse the returned data, and notify the main manager 303 when new data has arrived. In one particular embodiment, the data manager 301 further has access to a cache or other suitable storage, where chart data can be predictively cached. Thus, if a request for data is received, the data manager 301 can first check the cache for the requested data before issuing the request to the server system 105. Numerous caching schemes can be used, as will be apparent in light of this disclosure.

The news communication module 305 is programmed or otherwise configured to implement the dynamic news aspects of module 130. In particular, the news communication module 305 notifies the main manager 303 when the viewable time period of a displayed financial chart (e.g., stock price chart) has changed based on user input/interaction, so that the chart and news section to the side of the chart can be updated to display the different set of news that corresponds to the new time period.

The display manager 307 is programmed or otherwise configured to manage the display of data, based on input from the main manager 303 and the user interaction manager 311. The displayed areas of this example include text/hyperlinks, the main and overview charts, news flags overlaid on the main chart graph, and trading volume. Information/events for display from the main manager 303 are received by the display manager 307 and passed on to the corresponding display module (313, 315, 317, and 319). Also, events received from the user interaction manager 311 (or other modules) are received by the display manager 307, and passed to the main manager 303.

Each of the text module, 313, overview chart module 315, main chart module 317, and volume module 319 are programmed or otherwise configured to display information based on data/events that come from the display manager 307. Each of these modules 313, 315, 317, and 319 is also capable of generating events for getting new data when needed (e.g., when the user zooms into the last 5 days on a stock price chart, or otherwise interacts with a chart and generates a need for additional data). Each generated event is passed to the data manager 301 (via the display manager 307 and the main manager 303), which then sends a request for data to the server system 105. The data manager 301 then receives the requested data, and passes it to the appropriate modules 313, 315, 317, and 319, which process and/or display the data and charts formed therefrom.

The user interaction manager 311 is programmed or otherwise configured to process all the user interaction (e.g., via UI control mechanisms and/or chart dragging), and communicates with the display manager 307. The display manager 307 then notifies the appropriate modules (303, 313, 315, 317, and/or 319) of the user's intentions. For instance, if the user is requesting additional data (e.g., based on chart panning, dragging, or other adjusting), the display manager 307 notifies the main manager 330 to request the necessary data via the data manager 301. Likewise, if the user has changed a displayed feature, the display manager 307 notifies one or more of the 313, 315, 317, and 319 of the change so that those one or more modules can generate a data requesting event and/or reconfigure the displayed information based on data already available (e.g., cached or otherwise available to the module 130). Also the user interaction manager 311 communicates directly to the modules 313, 315, 317, and 319, each of which are registered as listeners to the user interaction manager 311 for performance purposes (e.g., for consistency of display and synchronized transitioning from one display to the next display.

User Interface

Figure 4:
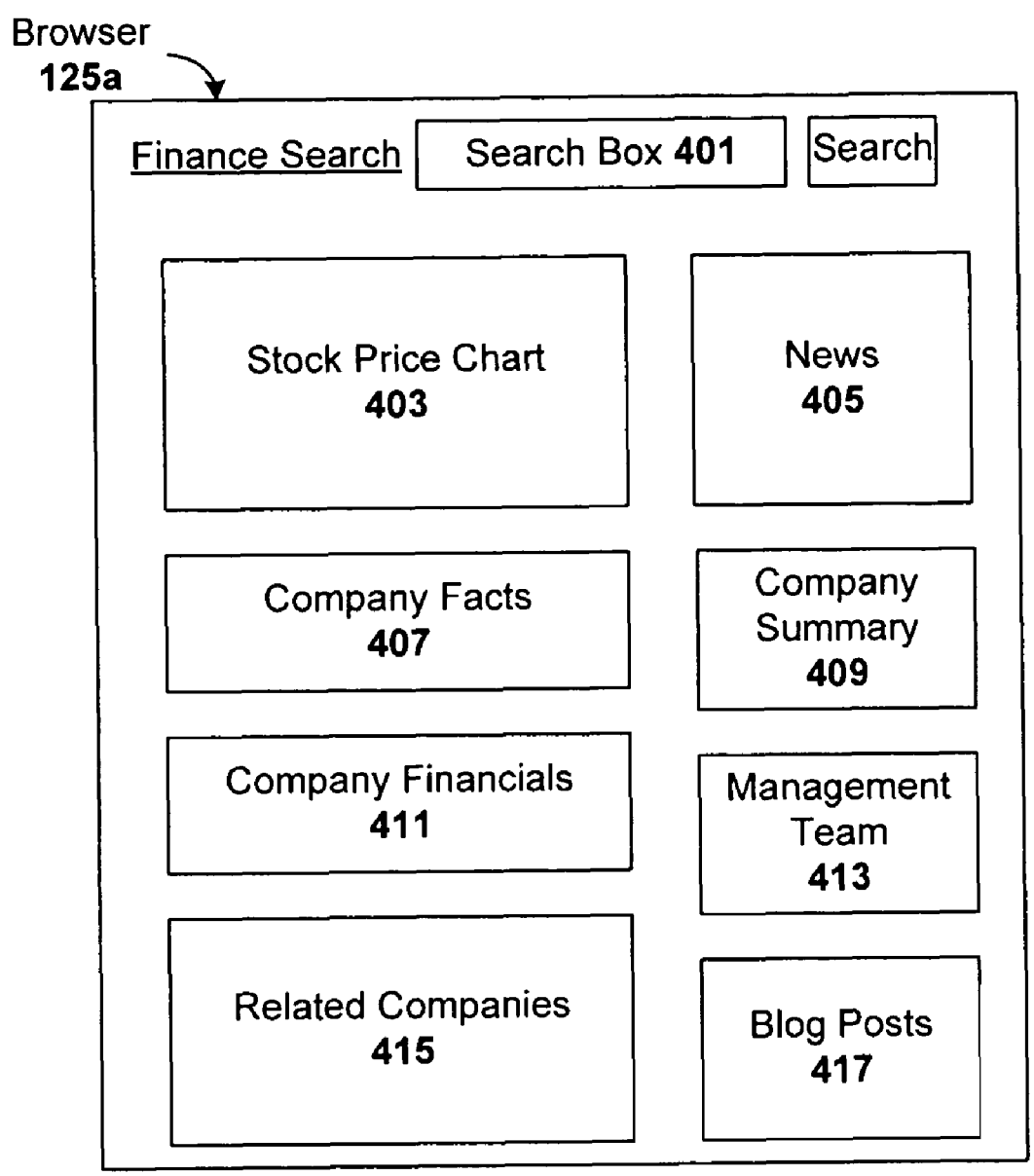
FIG. 4 is a block diagram of a user interface for a finance information service system, configured in accordance with another embodiment of the present invention.

FIG. 4 is a block diagram of a user interface for a finance information service system, configured in accordance with another embodiment of the present invention. The user interface can be implemented, for example, using JavaScript (or other suitable programming language) to draw the various charts and graphs, and to display the desired text provided by the server system 105 in response to requests from the finance module 130, as previously described. Other embodiments can be configured to draw the charts and other graphics at the server-side, so that they can be received by the finance module 130 and then displayed. Numerous server-side/client-side functionalities and drawing schemes will be apparent in light of this disclosure.

As previously explained, this embodiment of the user interface executes in the user's browser 125a and operates in conjunction with the finance module 130, and allows the user to interact with the finance system. The user interface of this example configuration includes a search box 401, a stock price chart 403, a news section 405, a company facts section 407, a company summary section 409, a company financials section 411, and management team section 413, a related companies section 415, and a blog posts section 417.

The search box 401 allows the user to enter a company name, ticker symbol, or other term(s) that can be used to identify a target entity (e.g., company, mutual fund, etc). The user can then initiate a search (e.g., by clicking the search button) for financial information relevant to that target entity. This action generates a request to the server system 105, which is processed as previously discussed with reference to FIGS. 1, 2a, and 2b.

The stock price chart 403 is the area that displays the stock price for the period of time requested by the user (e.g., 1 d, 5 d, 1 m, and so on). The user can interact with this area, for example, by clicking on user interface (UI) pan controls or dragging (click-and-hold) the chart in the desired direction of time. Such action results in the stock chart panning to the left or right, according to the user's input. The news section 405 is the area that displays snippets and links to new articles that correspond to news flags of the graph in the stock price chart 403. Recall that relevant stock/charting data can be provided by the stock information provider 115 and/or quote listener 201, and news articles (or links to news articles) can be harvested by the company info/news data miner module 205. The stock and news data/links are then provided to the financial module 130. The stock price chart 403 and news section 405 are discussed in further detail with reference to FIG. 5a.

Figure 5A:
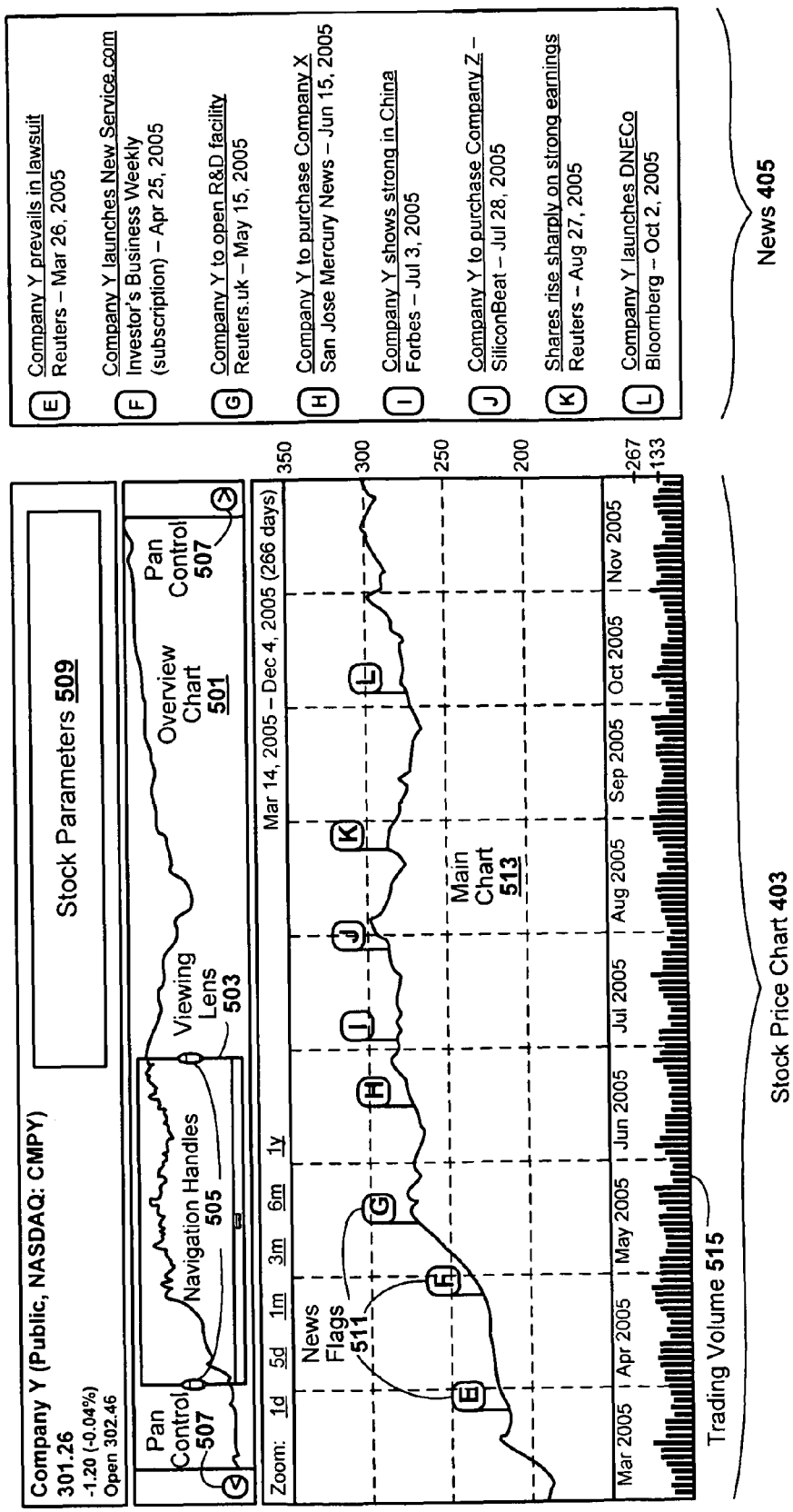

As can be seen in FIG. 5a, the stock price chart 403 in this example includes a main chart 513 with time-correlated news flags 511, an overview chart 501 with pan controls 507 and a viewing lens 503 configured with navigation handles 505, and a trading volume section 515. At the top of the chart is the name of the company (e.g., Company Y), along with its ticker symbol (e.g., CMPY) and the exchange (e.g., NASDAQ) on which the company is publicly traded. Also shown is the current stock price (e.g., 301.26), the daily change (e.g., −1.20 or −0.04%), and the opening price (e.g., 302.46). Also shown in the upper area are a number of stock parameters 509 (e.g., day's price range, 52-week range, volume, average volume, price to earnings ratio (P/E), forward P/E, earnings per share (EPS), beta, return on equity, market cap, sales, current dividend yield, dividend/share, opening price, previous closing price, bid, bid size, ask, ask size, institutional ownership percentage, total shares outstanding, etc). The overview chart 501 displays the stock price value for a longer available period of time, relative to the main chart 513. The price graph is drawn with the evolution of the stock price scaled to fit the width and height of this overview chart 501 area. The viewing lens 503 highlights the period of time on the overview chart 501 that is displayed in the main chart 513. The relationship between the view of the viewing lens 505 and the view of the main chart 513 is synchronous, in that whenever one of the views changes (through user interaction), the other view is updated accordingly. In one particular embodiment, the viewing lens 503 is drawn with a degree of opacity or semi-translucency, so as to accentuate its window/lens-like qualities. Other embodiments can implement the viewing lens 503 with no opacity. Also, related news article links displayed in the news section 405 can be updated responsive to the viewing lens 503 being adjusted, so that only news article links corresponding to the time period defined by the viewing lens 503 (and main chart 513) are displayed. In an embodiment where candidate related news article links are ranked, only N of top-ranked article links corresponding to the time period defined by the viewing lens 503 are displayed in the news section (e.g., N equals the number of article links that can be displayed in the news section 405). The navigation handles 505 on the left and right of the viewing lens 505 are draggable. The user can use these handles 505 to expand or contract the time period displayed by the main chart 513. This UI control allows the user to interact with displayed charts, and in particular, to dynamically zoom in and out to a certain time period of interest. Other UI zoom controls (e.g., such as the 1 d, 5 d, 1 m, 3 m, 6 m, and 1 y controls) can also be provided, which allow the user to statically adjust to preset time periods relative to the current day. Likewise, pan controls 507 allow the user to adjust the time scale of the overview map 501 (the viewing lens can either pan in sync, or remain at its current placement, depending on desired functionality). The viewing lens 503 may further be configured with a enable/disable radio buttons (or other suitable UI control mechanism). When disabled, the lens 503 is stowed (e.g., in lower right corner of overview map 503), with an enable button visible to the user. A tool-tip can be displayed if the user cursors over the enable button, if so desired (e.g., tool-tip: "Click to enable viewing lens"). When enabled, the disable button can be similarly presented to user (in the embodiment shown, the disable button is depicted in the middle of the bottom portion of the lens 503). As previously explained, when changing the current viewed time period (e.g., by UI controls such as navigation handles 505 or pan control 507), the news items of the news section 405 change accordingly, displaying snippets/links to only the news from the chart period displayed in the main map 403 area. In an embodiment that ranks candidate article links for display in news section 405, note that the highest ranked article link displayed for one time period may be subsequently outranked by a newly displayed article link included in the next selected time period. The news flags 511 (e.g., E through L) located on the main map 513 graph correspond to the news items in the news section 405 to the right side of the chart. Each letter represents one news item and is positioned on the chart at the time that the news appeared in the press (or was otherwise publicly reported). Note that multiple independent news sources (e.g., Reuters, Investor's Business Weekly, San Jose Mercury News, Forbes, SiliconBeat, Bloomberg, and/or other local, national, and/or international sources) can be correlated with the graph of main chart 513. In one particular embodiment, the user can select (e.g., mouse click or other suitable user input mechanism) a news flag 511 or link in news section 405 to open a new browser and display the corresponding article. As previously explained, such time-correlated symbols can also indicate relevant events (e.g., date merger agreement was signed, date new CEO started, and/or date range of infringement trial from opening statement to trial conclusion). One such embodiment uses time-correlated symbols to indicate a mix news articles and relevant events. The volume display area 515 displays the stock traded volume information.

As previously explained, the number of flags displayed on the graph can be different than the number of news articles shown in the news section (e.g., because flags take up less space than article links with snippets). Scrolling and panning (or other such user interface features) can be used to allow the user to efficiently manipulate data displayed by the chart 403 and news section 405. For instance, and in one particular embodiment, when the user clicks or otherwise selects a flag 511 that corresponds to a link that is not currently displayed in the news section 405, then the article links available to the news section 405 are scrolled (e.g., by operation of module 317) until that corresponding article link is visible within the news section 405. The user could then select that link to access the article content. Server-side and/or client-side pre-fetching and caching of news article links (and/or the articles themselves) can be used to allow for quick population of the news section 405 to facilitate scrolling. Also, if there is no news for the displayed time period of the chart 513, then news article links (and/or the articles themselves) from before and/or after that time period can be fetched and displayed in the news section 405. In such a case, the user can select these news items (e.g., flag and/or link) thereby causing the chart 513 to pan (e.g., by operation of module 317) until the time period to which the selected news item belongs is displayed. In another particular embodiment, users may also add custom flags to indicate activity or events. Flags can further be configured with tool tips to provide user with additional information. The tool tip can reflect, for example, the title and/or snippet of a corresponding article. Custom flags can be configured with a custom tool tip to identify the activity/event (e.g., "bought 1000 shares"). Custom flags can have a different look and feel than news flags so that they can be visually distinguished.

With reference back to FIG. 4, the company facts section 407 is the area that displays company facts (text) and links. For instance, the section 407 can be used to display the address of the company's headquarters, telephone and fax numbers, website URL and site links (e.g., such news releases corporate history/profile, executives, employment, investor relations, products and services), fiscal year end, past year sales amount, 1-year sales growth, yearly income, 1-year net income growth, number of employees, net profit margin (ttm), operating margin (ttm), return on average assets (ttm), return on average equity (ttm), and/or the company's official blog site. Recall that such data/links can be harvested by the company info/news data miner module 205 on the server-side, and then provided to the financial module 130 of the client-side. In alternative embodiments, such information harvesting can be carried out on the client-side, if so desired.

The company summary section 409 is the area that displays an overview or synopsis of the company's business (text). Such information may include a description of principle products and/or services provided by the company, as well as the company's general corporate philosophy. Links to additional sources of information about the company can also be provided for those interested. For instance, links to Reuters and Wikipedia can be used to provide additional object summary information about the company. Such data/links can be harvested by the company info/news data miner module 205 on the server-side, and then provided to the financial module 130 of the client-side. The user interface can be configured to open a new browser window for each link selected, if so desired. As with other sections described herein, linking back to original sources eliminates the need to store the relevant data within the system; although other embodiments can harvest and store the information if so desired and acceptable/legal to do so.

The company financials section 411 is an area that can be used to display various company financial data. In one embodiment, this section 411 includes links to both quarterly and yearly income statements, balance sheets, and/or cash flow statements. The company financials section 411 is discussed in further detail with reference to FIG. 5c. As can be seen, the user can choose to view either quarterly or yearly financials. In this example, the financials are in U.S. dollars, and include highlights (e.g., gross profit, operating income, net income, total assets, etc) in addition to links to the given financial statements. The management team section 413 indicates the company's executives and their respective titles. This section may include, for example, links to bios, curriculum vitae, and insider trading data. Also, news articles relevant to an executive can be linked. New browser window can be opened for each link selected, to preserve the user's stock chart page. Such data/links relevant to company financials and management can be harvested by the company info/news data miner module 205 on the server-side, and then provided to the financial module 130 of the client-side. Alternatively, or in addition to, client-side data/link harvesting can be used.

The related companies section 415 is the area that displays a set of companies related to the user's target company. As previously explained, and with reference to one embodiment, related companies are computed and verified based on a number of relationship indicators and their overlap with one or more categorical hierarchies of the target company (e.g., as performed by the related company identifier module 203 on the server-side). The hierarchal categories and the related companies are then served to the financial module 130 of the client-side for display. The related companies section 415 is discussed in further detail with reference to FIG. 5b. As can be seen, this example section 415 includes general business sector and industry groups (e.g., Technology and Computers Services, respectively). In addition, this example includes two sets of hierarchal categories to which the target company (CMPY) belongs. The first set of hierarchal categories is Media>Electronic Media>Web Navigation>Search Engines. The second set of hierarchal categories is Technology>Software>Enterprise Management>Content Management. Each is prioritized from most general> ... > most specific. The user can navigate these hierarchies (e.g., by clicking any one of the categories) to see a list of the companies placed in that category (e.g., list opens in a separate browser/window to preserve original grouping of related companies). If the category includes too many companies to list, then select companies can be listed (e.g., such as those with the largest market cap, or those most actively traded based on volume). The originally displayed hierarchy in this embodiment includes the most specific or "primary" categories (e.g., Search Engines and Content Management) of each set, so as to focus the group of related companies for the user (the user can explore the different categories within each hierarchy if so desired as previously explained). The list of related companies in this example includes the name of each company (e.g., hyperlinked to company website), the ticker symbol (e.g., linked to cause a financial search for that company using the system of FIG. 1), the current price, and the daily change.

The blog posts section 417 is an area that can be used to display various blogs relevant to the company, whether official company blogs or other party blogs. In one embodiment, this section 411 includes snippets of relevant postings and links to those postings, along with an ID of the blog and/or the poster. A ranking and/or filter system can be used to identify blog postings that are more relevant (e.g., so as to eliminate offensive postings and to give more weight to postings by well-respected sources. The blog data/links can be harvested, for example, by the company info/news data miner module 205 on the server-side, and then provided to the financial module 130 of the client-side. Alternatively, or in addition to, client-side blog data/link harvesting can be used.

Diverse Chart Data

As previously explained, the financial data of the main chart 513 graph can be a subset of the financial data of the overview chart 501 graph, such as where both the main and overview charts are stock price charts for the same company. Alternatively, the financial data of the main chart 513 graph can be distinct from the financial data of the overview chart 501 graph.

For example, the main chart 513 can be a stock price and the overview chart 501 can be a stock parameter other than price, such as EPS or P/E ratio. In one such embodiment, the user interface of FIG. 5a would further include a pull-down menu of graphable stock parameters (or other suitable UI mechanism) next to one or both charts that allows the user to select the stock parameter to be charted. Each new selection would generate an event (e.g., by operation of module 315 or 317) and cause finance module 130 to issue a request for the corresponding data, which upon receipt could then be processed and displayed as discussed with reference to FIG. 3. In another example, the main chart 513 can be a stock price and the overview chart 501 can be an index chart, such as S&P 500, Dow Jones Industrials, or NASDAQ composite. A similar UI mechanism (e.g., pull-down menu of indexes) could be used to implement this feature as well.

In another example, the main chart 513 and the overview chart 501 can both be stock price charts, but for different companies (or other entity). In one such embodiment, the user interface of FIG. 5a would further include a secondary search box/button (such as discussed with reference to search box 401 of FIG. 4) next to one or both charts. Engaging this secondary search feature would generate a request for the relevant financial data from the server system 105. Once the data is received, it can be processed as necessary (e.g., draw new chart with received data using JavaScript) and displayed in the appropriate area of the user interface. In one such embodiment, the news section 405 can be updated with article links relevant to the new target entity, if the secondary search is performed using the main chart 513.

Related Company Methodology

Figure 6:
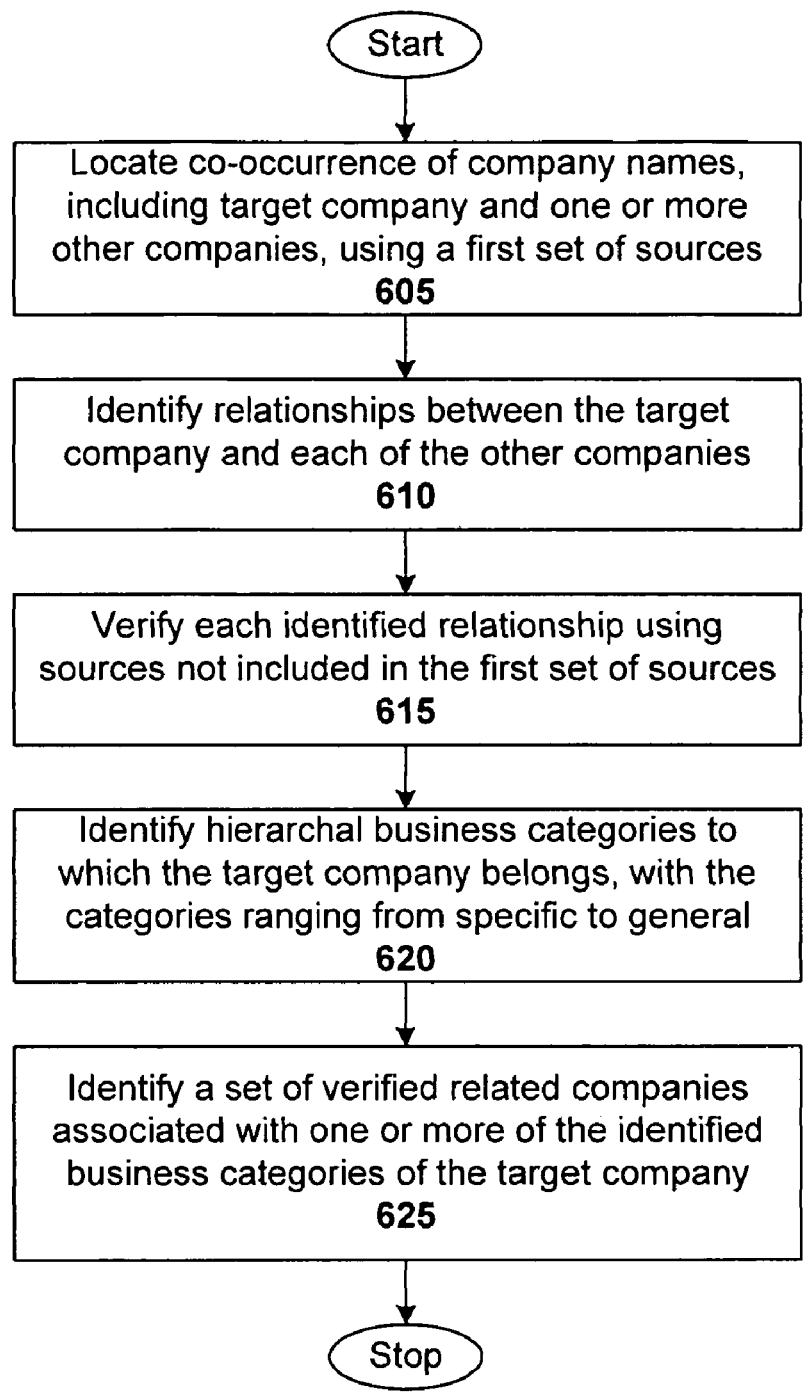
FIG. 6 illustrates a method for computing a group of related companies, configured in accordance with an embodiment of the present invention.

FIG. 6 illustrates a method for computing a group of related companies, configured in accordance with an embodiment of the present invention. This method can be carried out, for example, by the system shown in FIG. 1, and more particularly, by the related company identifier module 203 of the server system 105. Other embodiments can be configured where the method or a portion thereof is carried out on the client-side, as will be apparent in light of this disclosure.

The method includes locating 605 a co-occurrence of company names, including a target company and one or more other companies, using a first set of sources. As is known, texts available in any language often describe companies and their relationships. For instance, a news article can cover the story, "eBay to buy Skype." Contexts can be, for example, a single sentence, a paragraph, an article, a web log, or a web page. Such contexts list two or more company names together, and are amenable for analyses to mine for relationships. In one embodiment of the present invention, entity recognition techniques are used, where all proper nouns in a given context are identified and then qualified to be names of companies that are of interest (e.g., by comparing identified proper nouns to list or lookup table of names of interest). Other known techniques can also be used to facilitate the co-occurrence mining process. For instance, stemming can be used, where searches are extended to include plural forms and known variations, such as "Google", "GOOG", or "Google Inc." Also, aliases can be identified and included in the search (e.g., IBM is also known as "Big Blue"). Also, name sense disambiguation can be used. For example, the term HP can refer to Hewlett Packard or Hindustan Petroleum, and the exact connotation is disambiguated based on the context of the term's use (e.g., if the context also includes other words such as "printer" or "Compaq" then HP likely is referring to Hewlett Packard; if the context also includes other words such as "petroleum" or "refinery" then HP likely is referring to Hindustan Petroleum).

The method continues with identifying 610 relationships between the target company and each of the other companies. In more detail, a mere co-occurrence is insufficient to indicate a relationship. As such, the significance of the co-occurrence is measured or otherwise tested. Relationships between co-occurrences can be identified by one or more of the techniques previously described with reference to the relationship identifier module 253. For example, weight of a co-occurrence is low if the context had many companies mentioned at once. Also, co-occurrences at the start of an article or page can be weighted higher than co-occurrences toward the end of an article or page. Similarly, co-occurrences in special contexts like headlines or headings can be weighted higher. Also, the reputation of the context news source can be used as a co-occurrence weighting factor (e.g., the greater the reputation, the greater the weight given to the co-occurrence). Likewise, pagerank for a page associated with the context can be used as a co-occurrence weighting factor (e.g., the greater the pagerank of the page in which the co-occurrence was located, the greater the weight given to the co-occurrence). Also, contexts that include a co-occurrence along with special keywords (e.g., "rivals," "competitors," "partners," "acquisition," "merger," and other such business relationship indicator words) can be weighted higher than a naked co-occurrences, as previously explained. Similarly other words/phrases like "stocks rose" can be neglected since they do not indicate a real relationship between the companies. As previously explained, given all such available factors, an overall weight or score can be determined for each co-occurrence. If that overall score is over a certain threshold, then the co-occurrence is indicative of a relationship.

The method continues with verifying 615 each identified relationship using sources not included in the first set of sources. Relationships identified in 610 can be strengthened (e.g., by increasing overall score/weight), for example, based on supplemental information available from other sources that mention the business, geography, or stock exchange in which the co-occurring companies operate, and/or sources that mention competing products/services of the occurring companies. Further, this supplemental information can also be used to weaken identified relationships (e.g., by decreasing overall score/weight), for example, if the supplemental sources tend to treat the co-occurring companies disparately. Supplemental sources include, for example, business catalogues, directory services, and government registration lists. Several such business catalogues, directory services, and registration lists are available on the WWW (or other media) that list businesses organized along hierarchical categories. These categories typically list the industry type, geography, goods manufactured, and/or services provided. In accordance with one embodiment of the present invention, two co-occurring companies are closely related if they are mentioned in one or more of the same hierarchical categories. The relationship gets stronger with depth (into the hierarchy) of the matched category (e.g., which would increase overall score). The relationship strength between two co-occurring companies can also be computed based on the "distance" between the categories (e.g., the fewer the number of hops needed to reach one category in the hierarchy from another category, the greater the score increase). Another example supplemental source is competitor listings in SEC filings. Most stock exchanges list competitors to a company available from SEC filings. In accordance with one embodiment of the present invention, co-occurring companies are closely related if they are direct competitors (e.g., which would increase overall score). Another example supplemental source or relationship indicator is an overlap of industries/sectors/geographies in which the co-occurring companies operate. For instance, company profiles or other documents typically reveal the industries, sectors, and geographies in which a company operates. In accordance with one embodiment of the present invention, co-occurring companies are closely related if they have many of these features in common (e.g., 2 or more features in common would increase overall score). Another example supplemental source or relationship indicator is correlation between the movements of stock prices. In more detail, related companies normally show correlation between the movement of their stock prices. One embodiment of the present includes tracking the changes in stock price for a company over a time window, and identifying other companies that had very similar fluctuations. Such stock price correlation indicates a relationship between the companies (e.g., which would increase overall score). This fluctuation can be computed by discounting global or regional trends (e.g., a correction that impacted all stocks, not just a technology sector). Another example supplemental source or relationship indicator is the frequency of co-occurrence, where if the number of a particular co-occurrence is over a certain amount (e.g., 10 or more in a given period of time), then higher weight can be assigned to that co-occurrence (e.g., which would increase overall score). Another example supplemental source or relationship indicator is product overlap, and in particular, how many of the co-occurring companies' products belong to the same category (e.g., both Google Search and Yahoo Search belong to the search engines category; also, both Google Maps and Yahoo Maps belong to the maps category). Such product overlap is indicative of a relationship (e.g., which would increase overall score). Another example supplemental source or relationship indicator is co-occurrences in navigation history (in a small time window) for aggregated users. In more detail, co-occurrences of companies in aggregated user navigation histories (from multiple users) can be mined to yield relationships between companies. For example, the relationship between co-occurring companies is strengthened if many users tend to visit the same two company websites (or search for them) within close time intervals (e.g., which would increase overall score). Another example supplemental source or relationship indicator is co-occurrences in aggregated user portfolios. Users tend to maintain portfolios of the companies they are most interested in, and track their market growth regularly. Co-occurrence of two companies in a user's portfolio indicates a relationship. This relationship is strengthened if many users have those two companies in their portfolios (e.g., which would increase overall score). Note that if supplemental sources indicate a lack or contradiction of any of these factors the overall score can be lowered. Given all such available factors, the overall score computed at 610 can be adjusted up or down. If that adjusted overall score is over a certain threshold, then the identified relationship is verified.

The method continues with identifying 620 hierarchical business categories to which the target company belongs, with the categories in order of category priority (from primary category such as "Search Engines" to general secondary categories such as "Internet Services" and "technology"). For example, recall the related companies section 415 discussed with reference to FIG. 5*b*. That example includes two sets of hierarchal categories to which the target company (CMPY) belongs. The first set is Media>Electronic Media>Web Navigation>Search Engines. The second set is Technology>Software>Enterprise Management>Content Management. Each is prioritized from most general> . . . > most specific. It will be appreciated that other target companies may belong to only one set of hierarchal categories, or to more than two sets. Also, each set can include any number of categories. If there is a large number of categories, then a preset number of the higher priority categories can be used (e.g., the top 2 to 4 specific categories).

The method continues with identifying 625 a set of verified related companies associated with one or more of the identified business categories of the target company. For example, and using the hierarchal categories shown in the example of FIG. 5*b*, the two lists of companies under each category are examined. Recall that these categories and the companies that belong to them are publicly available from a number sources. Each category will typically include a large set of companies (recall that the user can select any category to open a new window that displays the full set of companies that belong to that category, according to some business listing source). Each of the verified related companies can then be compared to the full list of companies in each category, to identify matches.

The group of related companies that will be displayed to the user (in the related companies section 415) includes the verified related companies that were also on the full list. Note, however, that the order in which those verified related companies are displayed may be different from the order of companies in the full list, based on the overall scores computed for the companies as described herein. In one embodiment, the order of display is from the highest score to the lowest score (top to bottom), where the top M scores (e.g., M is between 5 and 15) are selected for display. If a top scoring verified related company is not on the full list, then it can be displayed anyway, and in a position of the overall order based on its score relative to the scores of other displayed related companies. In one particular embodiment, if a top scoring verified related company is not on the full list, then its score is reduced accordingly. In such a case, that company may display lower on the list of displayed related companies, or it may fall off the list (and possibly be replaced by another higher scoring verified related company). Other embodiments may be configured to not display any verified related company not on the full list. Various other such configurations will be apparent in light of this disclosure.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method, performed by a computer system, for determining whether a target company and a second company are related, the method comprising:

locating a co-occurrence of a target company name of the target company and a second company name of the second company in a first set of data sources;

identifying a business relationship between the target company and the second company based upon a relationship indicator appearing with the co-occurrence of the target company name and the second company name;

verifying the business relationship using a second set of data sources based upon the target company and the second company having in common at least two of the following features: an industry type, a geographic location, a type of product provided, and a type of service provided;

determining at least one of a plurality of hierarchical business categories to which the target company and the second company belong;

determining a relationship strength value based on the relationship indicator, the second set of data sources and the determined hierarchical business category, the relationship strength value increasing or decreasing based on a depth of the determined business category in hierarchy; and identifying the second company as related to the target company when the relationship strength value is over a threshold.

2. The method of claim 1 further comprising:

providing for display the second company as a related company in response to a user request for financial information about the target company.

3. The method of claim 1 wherein locating the co-occurrence further comprises:

identifying proper nouns in the first set of data sources; and identifying company names included in the identified proper nouns.

4. The method of claim 1 wherein locating the co-occurrence further comprises:

identifying known name variations of the target company;

identifying known aliases of the target company; and disambiguating ambiguous terms based on co-occurrence context.

5. The method of claim 1 wherein identifying the business relationship further comprises:
determining an overall score for the co-occurrence of the target company name and the second company name; and
indicating the business relationship between the target company and the second company if the overall score satisfies a relationship indicator threshold.

6. The method of claim 5 wherein the overall score is based upon the following:
a number of companies indicated in the co-occurrence;
a location in a document including the co-occurrence of the target company name and the second company;
a source of the document including the co-occurrence of the target company name and the second company;
the features that the target company and the second company have in common; and
a pagerank associated with the document including the co-occurrence of the target company name and the secondary second company.

7. The method of claim 5 wherein verifying the business relationship further comprises:
adjusting the overall score for the business relationship, based on one or more supplemental relationship indicators; and
verifying the business relationship if the adjusted overall score satisfies a verified relationship indicator threshold.

8. The method of claim 1 wherein verifying the business relationship further comprises:
determining an overall score for the business relationship, based on one or more relationship indicators; and
verifying the business relationship if the overall score satisfies a relationship indicator threshold.

9. The method of claim 8 wherein the overall score is based upon one or more of the following:
at least one of competing products and services provided by the target company and the second company;
an overlap of at least one of industries, sectors, and geographies in which the target company and the second company operate;
a correlation between movements of stock prices of the target company and the second company;
a frequency of the co-occurrence of the target company name and the second company name that exceeds a co-occurrence frequency threshold;
co-occurrences of the target company name and the second company name in aggregated user website navigation histories; and
co-occurrences of the target company name and the second company name in aggregated user stock portfolio data.

10. The method of claim 1, further comprising:
identifying a third company name of a third company as related to the target company name when
the third company name co-occurs with the target company name in the first set of data sources,
a third relationship is identified between the target company name and the third company name based upon a third relationship indicator appearing with co-occurrence of the third company name and the target company name,
the third relationship is verified using the second set of sources based upon the target company and the third company having in common at least two of the following features: an industry type, a geographic location, a type of product provided, and a type of service provided, and
the third company name belongs to at least one of a plurality of hierarchical business categories to which the target company name belongs;
determining a first overall score for the relationship and a second overall score for the third relationship, based on the relationship indicator and the third relationship indicator; and
displaying the second company and the third company in an order based on the first overall score and the second overall score.

11. A machine-readable medium encoded with instructions, that when executed by one or more processors, cause the processor to carry out a process for determining whether a target company and a second company are related, the process comprising:
locating a co-occurrence of a target company name of the target company and a second company name of the second company in a first set of data sources;
identifying a business relationship between the target company and the second company based upon a relationship indicator appearing with the co-occurrence of the target company name and the second company name;
verifying the business relationship using a second set of data sources based upon the target company and the second company having in common at least two of the following features: an industry type, a geographic location, a type of product provided, and a type of service provided;
determining at least one of a plurality of hierarchical business categories to which the target company and the second company belong;
determining a relationship strength value based on the relationship indicator, the second set of data sources and the determined hierarchical business category, the relationship strength value increasing or decreasing based on a depth of the determined business category in hierarchy; and
identifying the second company as related to the target company when the relationship strength value is over a threshold.

12. The machine-readable medium of claim 11, the process further comprising:
providing for display the second company as related company in response to a user request for financial information about the target company.

13. The machine-readable medium of claim 11 wherein locating the co-occurrence further comprises:
identifying proper nouns in the first set of data sources; and
identifying company names included in the identified proper nouns.

14. The machine-readable medium of claim 11 wherein locating the co-occurrence further comprises:
identifying known name variations of the target company;
identifying known aliases of the target company; and
disambiguating ambiguous terms based on co-occurrence context.

15. The machine-readable medium of claim 11 wherein identifying the business relationship further comprises:
determining an overall score for the co-occurrence of the target company and the second company, based on the relationship indicator appearing in the co-occurrence; and indicating the business relationship between the target company and the second company if the overall score satisfies a relationship indicator threshold.

16. The machine-readable medium of claim 15 wherein the overall score is based upon the following:
    a number of companies indicated in the co-occurrence; and
    a location in a document including the co-occurrence of the target company name and the secondary company.

17. The machine-readable medium of claim 15 wherein the overall score is based upon the following:
    a source of the document including the co-occurrence of the target company name and the second company.

18. The machine-readable medium of claim 15 wherein the overall score is based upon the following:
    a pagerank associated with a document including the co-occurrence of the target company name and the secondary company.

19. The machine-readable medium of claim 15 wherein verifying the business relationship further comprises:
    adjusting the overall score for the business relationship, based on one or more supplemental relationship indicators; and
    verifying the business relationship if the adjusted overall score satisfies a verified relationship indicator threshold.

20. The machine-readable medium of claim 11 wherein verifying the business relationship further comprises:
    determining an overall score for the business relationship, based on one or more relationship indicators; and
    verifying the business relationship if the overall score satisfies a relationship indicator threshold.

21. The machine-readable medium of claim 20 wherein the overall score is based upon the following:
    business, geography, or stock exchange of the target company and the second company.

22. The machine-readable medium of claim 20 wherein the overall score is based upon the following:
    at least one of competing products and services provided by the target company and the second company.

23. The machine-readable medium of claim 20 wherein the overall score is based upon the following:
    disparate treatment of the target company and the second company in a document.

24. The machine-readable medium of claim 20 wherein the overall score is based upon the following:
    presence of the target company and the second company in one or more similar hierarchical categories.

25. The machine-readable medium of claim 20 wherein the overall score is based upon the following:
    the target company and the second company are direct competitors.

26. The machine-readable medium of claim 20 wherein the overall score is based upon the following:
    an overlap of at least one of industries, sectors, and geographies in which the target company and the second company operate.

27. The machine-readable medium of claim 20 wherein the overall score is based upon the following:
    a correlation between movements of stock prices of the target company and the second company.

28. The machine-readable medium of claim 20 wherein the overall score is based upon the following:
    a frequency of the co-occurrence of the target company name and the second company name that exceeds a co-occurrence frequency threshold.

29. The machine-readable medium of claim 20 wherein the overall score is based upon the following:
    overlap of products of the target company and the second company.

30. The machine-readable medium of claim 20 wherein the overall score is based upon the following:
    co-occurrences of the target company name and the second company name in aggregated user website navigation histories.

31. The machine-readable medium of claim 20 further comprising:
    identifying a third company name of a third company as related to the target company name when
        the third company name co-occurs with the target company name in the first set of data sources,
        a third relationship is identified between the target company name and the third company name based upon a third relationship indicator appearing with co-occurrence of the third company name and the target company name,
        the third relationship is verified using the second set of sources based upon the target company and the third company having in common at least two of the following features: an industry type, a geographic location, a type of product provided, and a type of service provided, and
        the third company name belongs to at least one of a plurality of hierarchical business categories to which the target company name belongs;
    determining a first overall score for the relationship and a second overall score for the third relationship, based on the relationship indicator and the third relationship indicator; and
    displaying the second company and the third company in an order based on the first overall score and the second overall score.

32. A system for determining whether a target company and a second company are related, comprising:
    a computer processor for executing programmed instructions;
    a program memory, coupled to the processor, for storing program instruction steps for execution by the processor;
    a co-occurrence mining module, executable by the processor in accordance with program instructions in the program memory, for locating a co-occurrence of a target company name of the target company and a second company name of the second company in a first set of data sources;
    a relationship identifier module, executable by the processor in accordance with program instructions in the program memory, for identifying a business relationship between the target company and the second company based upon a relationship indicator appearing with the co-occurrence of the target company name and the second company name;
    a relationship verifier module, executable by the processor in accordance with program instructions in the program memory, for verifying the business relationship using a second set of data sources based upon the target company and the second company having in common at least two of the following features: an industry type, a geographic location, a type of product provided, and a type of service provided;
    a hierarchical category identifier module, executable by the processor in accordance with program instructions in the program memory, for determining at least one of a plurality of hierarchical business categories to which the target company and the second company belong; and a hierarchical category placer module, executable by the processor in accordance with program instructions in the program memory, for determining a relationship strength value based on the relationship indicator, the second set of data sources and the determined hierarchical business category, the relationship strength value increasing or decreasing based on a depth of the determined business category in hierarchy, and for identifying the second company as related to the target company when the relationship strength value is over a threshold.

33. The system of claim 32 wherein the relationship identifier module is further configured for determining an overall score for the co-occurrence of the target company and the second company, based on the relationship indicator appearing in the co-occurrence, and for indicating the relationship between the target company and the second company if the overall score satisfies a relationship indicator threshold.

34. The system of claim 32 wherein the relationship verifier module is further configured for adjusting the overall score for the business relationship, based on one or more supplemental relationship indicators, and for verifying the business relationship if the adjusted overall score satisfies a verified relationship indicator threshold.

35. The system of claim 32 wherein the relationship verifier module is further configured for determining an overall score for the business relationship, based on one or more relationship indicators, and for verifying the business relationship if the overall score satisfies a relationship indicator threshold.

36. A system for determining whether a target company and a second company are related, the system comprising:

a computer processor for executing programmed instructions;

a program memory, coupled to the processor, for storing program instruction steps for execution by the processor;

means, executable by the processor in accordance with program instructions in the program memory, for locating a co-occurrence of a target company name of the target company and a second company name of the second company in a first set of data sources;

means, executable by the processor in accordance with program instructions in the program memory, for identifying a business relationship between the target company and the second company based upon a relationship indicator appearing with the co-occurrence of the target company name and the second company name;

means, executable by the processor in accordance with program instructions in the program memory, for verifying the business relationship using a second set of data sources based upon the target company and the second company having in common at least two of the following features: an industry type, a geographic location, a type of product provided, and a type of service provided;

means, executable by the processor in accordance with program instructions in the program memory, for determining at least one of a plurality of hierarchical business categories to which the target company and the second company belong;

means, executable by the processor in accordance with program instructions in the program memory, for determining a relationship strength value based on the relationship indicator, the second set of data sources and the determined hierarchical business category, the relationship strength value increasing or decreasing based on a depth of the determined business category in hierarchy; and means, executable by the processor in accordance with program instructions in the program memory, for identifying the second company as related to the target company when the relationship strength value is over a threshold.

* * * * *